United States Patent
Maluf et al.

(10) Patent No.: US 12,556,480 B2
(45) Date of Patent: Feb. 17, 2026

(54) APPARATUS AND METHODS TO PERFORM LATTICE ROUTING

(71) Applicant: Cisco Technology, Inc., San Jose, CA (US)

(72) Inventors: David Maluf, Mountain View, CA (US); Maik Guenter Seewald, Nuremberg (DE); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 18/734,119

(22) Filed: Jun. 5, 2024

(65) Prior Publication Data

US 2025/0379818 A1   Dec. 11, 2025

(51) Int. Cl.
  *H04L 45/748* (2022.01)
  *H04L 45/42* (2022.01)
  *H04L 45/58* (2022.01)

(52) U.S. Cl.
  CPC ............ *H04L 45/748* (2013.01); *H04L 45/42* (2013.01); *H04L 45/58* (2013.01)

(58) Field of Classification Search
  CPC ........ H04L 45/748; H04L 45/42; H04L 45/58
  USPC ........................................................ 709/238
  See application file for complete search history.

(56) References Cited

U.S. PATENT DOCUMENTS

| | | | |
|---|---|---|---|
| 10,454,830 B2 * | 10/2019 | Xu | ........................ H04L 47/11 |
| 2008/0228940 A1 | 9/2008 | Thubert | |
| 2018/0351863 A1 | 12/2018 | Vairavakkalai et al. | |
| 2019/0149472 A1 | 5/2019 | Singh et al. | |
| 2019/0296999 A1 | 9/2019 | Dutta | |
| 2024/0039827 A1 | 2/2024 | Kaplan et al. | |

FOREIGN PATENT DOCUMENTS

CN    111149329 A *   5/2020   ............ H04L 45/16

* cited by examiner

*Primary Examiner* — Adil Ocak
(74) *Attorney, Agent, or Firm* — Polsinelli P.C.

(57) ABSTRACT

Systems, methods, and computer-readable media are provided for lattice routing across a plurality of routers. An example method can include receiving, by a first router of a lattice including a plurality of routers, an Internet Protocol packet including a source Internet Protocol prefix and an index number, where the plurality of routers of the lattice is indexed in a lattice index, and where the plurality of routers is configured to forward the Internet Protocol packet to routers of the plurality of routers based on the index number, shuffling, by the first router, the source Internet Protocol prefix, determining, by the first router and based on the index number, whether the first router is the egress router, and sending, by the first router, the Internet Protocol packet with a shuffled source Internet Protocol prefix to a next node.

20 Claims, 6 Drawing Sheets

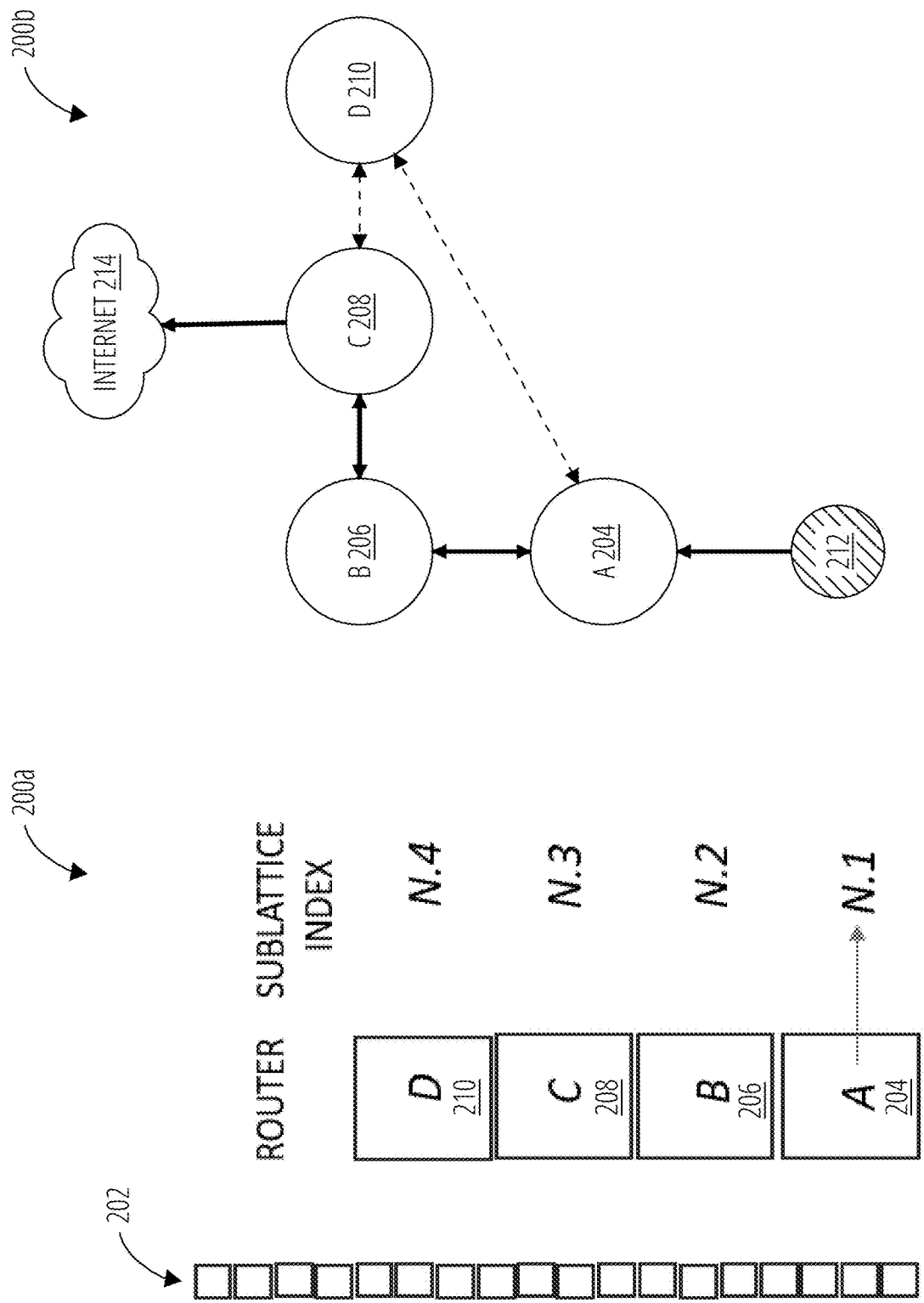

12,556,480 B2

APPARATUS AND METHODS TO PERFORM LATTICE ROUTING

BACKGROUND

Digital communications has grown to become an integral part of every day life. As users increasingly browse the Internet, communicate with friends and family through e-mail and instant messaging, and otherwise interact digitally, there is an increasingly larger amount of information that is left behind through these interactions. Users are also becoming more concerned about both digital security and digital privacy. While some networking methods provide additional security and/or privacy, these networking methods often are difficult to use and/or have other downsides. Consequently, users desire to have methods and systems that provide improved data security and/or privacy.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates an example lattice, sub-lattice, and index of routers in accordance with some aspects of the present technology.

FIG. 2B illustrates an example sub-lattice in accordance with some aspects of the present technology.

DETAILED DESCRIPTION

Figure 1:
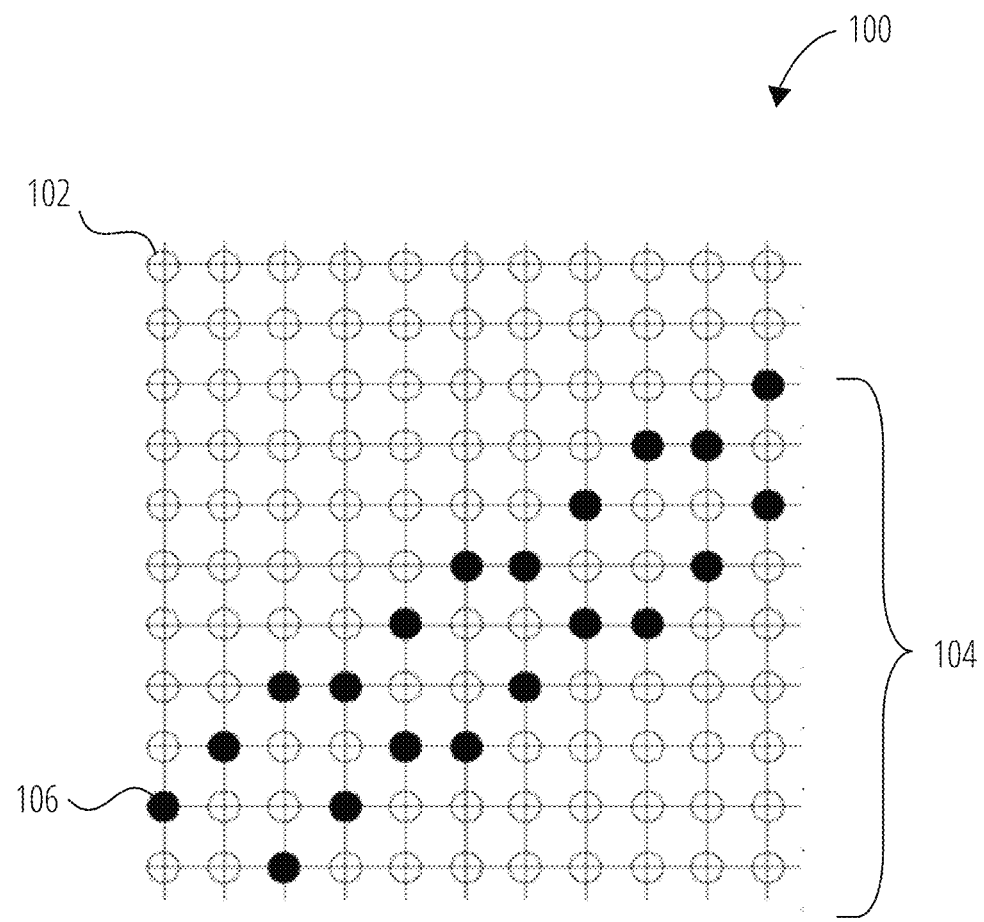
FIG. 1 illustrates an example lattice of routers in accordance with some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

In one aspect, a method for lattice routing across a plurality of routers, the method includes receiving, by a first router of a lattice including a plurality of routers, an Internet Protocol (IP) packet including a source Internet Protocol prefix and an index number, where the plurality of routers of the lattice is indexed in a lattice index, and where the index number is used to determine an egress router of the plurality of routers of the lattice for the Internet Protocol packet, and where the plurality of routers is configured to forward the Internet Protocol packet to routers of the plurality of routers based on the index number, shuffling, by the first router, the source Internet Protocol prefix, determining, by the first router and based on the index number, whether the first router is the egress router, and sending, by the first router, the Internet Protocol packet with a shuffled source Internet Protocol prefix to a next node.

In another aspect, the first router is not the egress router, and wherein the next node is a second router of the lattice.

In another aspect, the shuffled source Internet Protocol prefix of the Internet Protocol packet is further shuffled by the second router prior to being forwarded to a subsequent node.

In another aspect, the first router is the egress router, and wherein the next node is a destination host.

In another aspect, the index number is produced using an interface identifier of the Internet Protocol packet.

In another aspect, the method also includes receiving, by the first router, a response packet, and attempting, by the first router, to decipher the interface identifier.

In another aspect, the method also includes determining, by the first router and based on successful deciphering of the interface identifier, that the first router is an origin router, wherein successfully deciphering the interface identifier recovers the source Internet Protocol prefix, and sending, by the first router, the response packet to a requesting client, wherein the Internet Protocol packet is received from the requesting client.

In another aspect, the method also includes determining, by the first router and based on unsuccessful deciphering of the interface identifier, that the first router is not an origin router, and sending, by the first router, the response packet to another router of the lattice based on the lattice index.

In another aspect, the first router is a router of a sub-lattice that is a subset of routers of the plurality of routers of the lattice.

In one aspect, a non-transitory computer-readable medium storing instructions thereon, where the instructions, when executed by one or more processors, cause the one or more processors to perform operations includes: receive, by a first router of a lattice including a plurality of routers, an Internet Protocol (IP) packet including a source Internet Protocol prefix and an index number, where the plurality of routers of the lattice is indexed in a lattice index, and where the index number is used to determine an egress router of the plurality of routers of the lattice for the Internet Protocol packet, and where the plurality of routers is configured to forward the Internet Protocol packet to routers of the plurality of routers based on the index number, shuffle, by the first router, the source Internet Protocol prefix, determine, by the first router and based on the index number, whether the first router is the egress router, and send, by the first router, the Internet Protocol packet with a shuffled source Internet Protocol prefix to a next node.

In one aspect, a system includes a processor, and a non-transitory memory storing computer-executable instructions thereon, where the computer-executable instructions, when executed by the processor, cause the processor to perform operations includes: receive, by a first router of a lattice including a plurality of routers, an Internet Protocol (IP) packet including a source Internet Protocol prefix and an index number, where the plurality of routers of the lattice is indexed in a lattice index, and where the index number is used to determine an egress router of the plurality of routers of the lattice for the Internet Protocol packet, and where the plurality of routers is configured to forward the Internet Protocol packet to routers of the plurality of routers based on the index number. The system also includes shuffle, by the first router, the source Internet Protocol prefix. The system also includes determine, by the first router and based on the index number, whether the first router is the egress router. The system also includes send, by the first router, the Internet Protocol packet with a shuffled source Internet Protocol prefix to a next node.

Description

Digital communications has grown to become an integral part of every day life. As users increasingly browse the Internet, communicate with friends and family through e-mail and instant messaging, and otherwise interact digitally, there is an increasingly larger amount of information that is left behind through these interactions. Users are also becoming more concerned about both digital security and digital privacy. While some networking methods provide additional security and/or privacy, these networking methods often are difficult to use and/or have other downsides. Consequently, users desire to have methods and systems that provide improved data security and/or privacy.

Some methods of networking are capable of shuffling some parts of Internet protocol (IP) packets. Modern network communications across the internet utilize IP addresses. Within these IP addresses are prefixes that identify sources of packets and/or sessions. General routing practices expect source clients and router IPs to be fixed for the purpose of reverse lookup and return packets for higher level protocols. Accordingly, third parties are still able to ascertain the source of the packets, despite shuffling of other aspects of the IP packets. The prefixes remains visible on the network and can be used to track packets and/or sessions. This can result in reduced privacy for users. In some scenarios, this can also result in security concerns for the users. It is thus desirable to prevent the prefix from being used to track packets and/or sessions.

However, there are difficulties with shuffling source prefixes for the IP packets. The prefixes cannot be masked or otherwise changed because the prefix is used to route the packet. For example, shuffling the source IP prefix presents challenges in returning traffic back to the source. By shuffling the source IP prefix, routers are unable to determine where to return traffic that the source requested, negating the purpose of accessing the Internet. Consequently, there is a need to both improve privacy and security and preserve the ability for the packet to be routed.

The present technology addresses the need for improved routing that provides both improved security and privacy by proposing utilizing lattice routing to provide both improved security and privacy. Lattice routing is a method for routing data packets at Layer 3 and Layer 4 communication layers (e.g., the Network Layer and the Transport Layer, respectively). More specifically, a set of routers are organized in a lattice layout, such that the layout sets a type of relationship among the routers for purposes of lattice routing. Additionally, the present technology contemplates additional encryption and/or decryption tailored for the Layer 6 communication layer (e.g., the Presentation Layer).

Lattice Routing is distinct from The Onion Router (TOR). Lattice Routing falls under segment routing with prefix rewriting determined by lattice designs, while TOR networking is centered on the concept of layering encrypted data packets, much like the layers of an onion. TOR achieves this through encryption at the application layer within the communication protocol stack, creating multiple layers of encryption. In contrast, lattice routing is specifically designed for communication layers L3 and L4, operating by changing the source router's IP addresses, which effectively masks the original source IPs.

Segment routing simplifies network operations by removing the need for intermediate routers to hold network state information. Instead, it embeds the entire routing path information directly into the packet headers at the entry node, setting up a network-wide path. Lattice routing advances this concept by establishing a pre-determined route within a lattice graph structure. As the data packet travels through this network, its source IP prefix is systematically altered to new IPs, distinct from the original ones. Accordingly, lattice routing enhances both security and privacy.

A lattice design can be a mathematical matrix delineating subgraphs of connections organized in lattices and designed and/or optimized towards objectives such as adding complexity in conjunction with optimal paths. Each router participating in the lattice routing configuration can be arbitrarily configured with a lattice design (e.g., defined by a controller). The lattice design can be implemented as a graph database (e.g., implemented as a data structure) persistent in the router's memory.

Lattice routing is atomic and operates at a packet level. The set of routers are configured to send and receive packets in the lattice, while also altering the packets to generate complexity and prevent third parties from identifying a source of the packets. For example, each packet originating from a source router will change its source IP (e.g., prefix in IPV6) at every hop for routes involved in the lattice routing configuration. For example, a function of a lattice router can include replacing the incoming source IP with the router IP (e.g., prefix rewriting), making reverse traffic and reverse lookup valid to the current lattice router and not the origin router.

As discussed above, shuffling the source IP for the packets presents challenges for returning responses back to the origin or source. The present technology can utilize the lattice design, encryption and decryption, and the communications amongst the routers of the lattice to properly route response packets to the intended client or source.

Each router can privately maintain methods for encoding and decoding an interface identifier (ID) of an IP in an IPV6 packet. A received packet having a destination of any of the routers participating in the lattice design will continue being routed toward the next hop in the lattice until one of the routers is capable of interpreting the true destination of the packet. For example, each router may have different encoding/decoding methods. When a response packet is received in response to a requesting packet, the response packet may include a destination IP for an egress router of the lattice. The egress router may attempt to decode the destination IP and determine that the egress router is not the true destination for the response packet (e.g., by failing to decode the based on the interface ID and/or performing validity checks) and provide the packet towards the next router in the lattice until the originating router is found (e.g., by successfully decoding the interface ID and recovering the actual IP of the client or requestor).

Turning now to the drawings, FIG. 1 illustrates a lattice matrix 100 including a plurality of routers 102. Plurality of routers 102 are configured to communicate with other routers in the lattice matrix 100. In some embodiments, a subset of routers are selected to form a sub-lattice 104. For example, sub-lattice 104 includes sub-lattice routers 106 which are illustrated in FIG. 1 as the filled circles.

Plurality of routers 102 and sub-lattice routers 106 are configured to communicate with other devices including other ones of plurality of routers 102 and sub-lattice routers 106. For example, plurality of routers 102 and sub-lattice routers 106 are configured to send and receive IP packets with other devices. Additionally, plurality of routers 102 and sub-lattice routers 106 are configured to encode and decode an interface identifiers of an IP in IP packets. For example, plurality of routers 102 and sub-lattice routers 106 can encode and decode an interface ID of an IP in an IPV6 packet. In some embodiments, plurality of routers 102 and sub-lattice routers 106 can privately maintain methods to encode and decode the interface ID of the IP of the IP packets. Plurality of routers 102 and sub-lattice routers 106 are also configured to perform various functions. For example, plurality of routers 102 and sub-lattice routers 106 are configured with a function to replace or otherwise alter a source IP address of a packet (e.g., prefix rewriting). For example, plurality of routers 102 and sub-lattice routers 106 can replace a source IP with an IP of the router (e.g., changing the source IP to the router IP). By editing the source IP, one or more of plurality of router 102 or sub-lattice router 106 makes reverse traffic and reverse lookup valid to the one or more of plurality of routers 102 or sub-lattice router and not the source device.

For any received packet having a destination of any of plurality of routers 102 and/or sub-lattice routers 106 in the lattice, each router of plurality of routers 102 and/or sub-lattice router 106 is configured to attempt interpreting the true destination of the packet from the interface ID (e.g., by decoding the interface ID to attempt to obtain the original source IP). If decoding is unsuccessful, one or more of plurality of routers 102 and/or sub-lattice router 106 can continue routing the packet toward a next hop in the lattice until a router of plurality of routers 102 and/or sub-lattice router 106 is capable of successfully decoding the interface ID.

FIG. 2A illustrates a lattice design 200a having a plurality of routers 202. A subset of routers including node 204, node 206, node 208, and node 210 are selected to generate a sub-lattice. Node 204 is router A and indexed in a sub-lattice index as Node 1. Node 206 is router B and indexed in the sub-lattice index as Node 2. Node 208 is router C and indexed in the sub-lattice index as Node 3. Node 210 is router D and indexed in the sub-lattice index as Node 4.

FIG. 2B illustrates a sub-lattice 200b including node 204, node 206, node 208, and node 210. The sub-lattice 200b is in communication with a device 212 and Internet 214.

Node 204, node 206, node 208, and node 210 are configured to send and receive packets between other nodes, devices, and the Internet 214, as illustrated by both the bolded lines and the dashed lines. In some embodiments, the sub-lattice 200b can be configured to have communications flowing between particular nodes. For example, node 204 (e.g., router A) is configured to receive communications from device 212, while also being configured to directly send and receive packets with node 206 (e.g., router B) and node 210 (e.g., router D), but not node 208 (e.g., router C). In some embodiments, the communications can be unilateral. For example, in some embodiments, node 204 (e.g., router A) may be configured to send packets to node 206 (e.g., router B), but not receive packets from node 206 (e.g., router B). Similarly, node 204 (e.g., router A) can be configured to receive packets from node 210 (e.g., router D), but not send packets to node 210 (e.g., router D). One of ordinary skill in the art would understand that various different combinations of unidirectional, bidirectional, and omnidirectional paths can be used for communications among the various nodes of a sub-lattice.

FIG. 2B also demonstrates a flow of communications beginning with device 212 using the bolded lines. For example, device 212 may attempt to access some data in the Internet 214. Device 212 may send an IP packet to the sub-lattice 200b, in which node 204 (e.g., router A) the IP packet. As discussed above, node 204 can change a source IP prefix of the IP packet to an IP of node 204. The IP packet can include an interface ID. Node 204 can encrypt the interface using a random and/or unique encryption such that, node 204 is able to decrypt the interface, while making it challenging for other devices to decrypt the interface. Node 204 can be configured to determine an index number based on the interface ID. For example, the interface ID can be used to generate the index number. For example, the interface ID can be used as a seed to randomly generate a number that is used as the index number. The index number is then used to determine an egress point or router of the sub-lattice 200b. FIG. 2B illustrates node 208 (e.g., router C) as the egress router. Node 204 can then determine whether it is the egress router based on the index number. Since node 204 is not the egress router, node 204 sends the IP packet with the changed source IP to a next hop of the sub-lattice 200b, which is illustrated as node 206 (e.g., router B).

Node 206 (e.g., router B) can perform the same or similar operations. For example, node 206 will receive the IP packet with the changed source IP from node 204 (e.g., router A). Node 206 can then change the changed source IP again with an IP of node 206. Node 206 can also determine whether it is the egress router based on the index number. Since node 206 is also not the egress router, node 206 sends the IP packet with the now twice-changed source IP to a next hop of the sub-lattice 200b, which is illustrated as node 208 (e.g., router C).

Node 208 (e.g., router C) also performs the same or similar operations. Node 208 will receive the IP packet with the twice-changed source IP from node 206 (e.g., router B). Node 208 then changes the twice-changed source IP again with an IP of node 208. Node 208 also determines whether it is the egress router based on the index number. In this example, node 208 is the egress router. Consequently, node 208 sends the IP packet with the now thrice-changed source IP out of the sub-lattice 200b to a next hop, which is illustrated as some device in Internet 214.

While the sub-lattice 200b is illustrated with both bolded and dashed lines, one of ordinary skill in the art would understand that each node of the sub-lattice 200b can be configured to communicate with other nodes of the sub-lattice 200b (e.g., illustrated with dashed lines) and that the bolded lines are distinguished from the dashed lines for clarity and discussion of the above example. The usage of bolded and dashed lines is continued in the same manner for FIG. 3A and FIG. 3B.

Figure 3B:
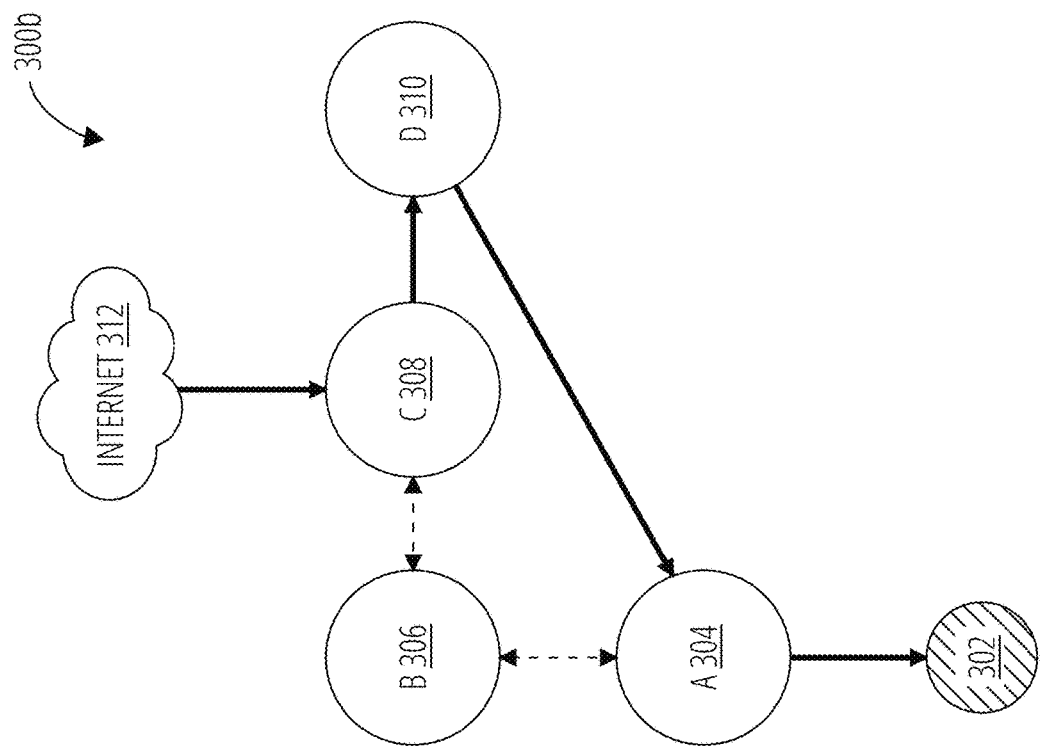
FIG. 3B illustrates an example sub-lattice in accordance with some aspects of the present technology.
Figure 3A:
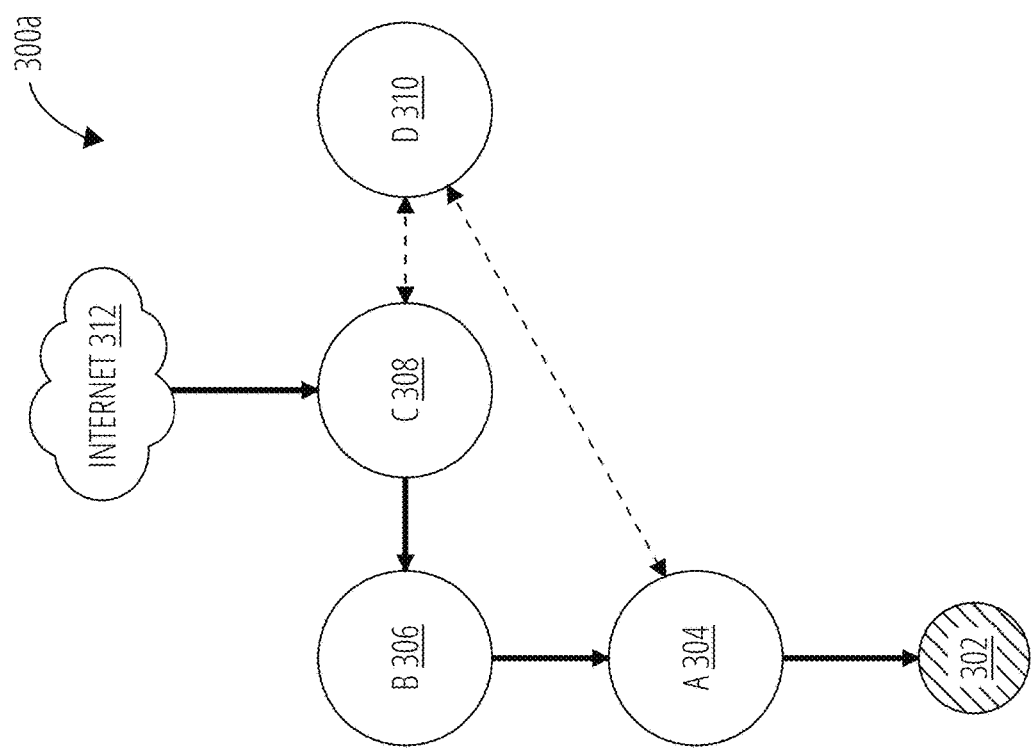
FIG. 3A illustrates an example sub-lattice in accordance with some aspects of the present technology.

FIG. 3A illustrates a sub-lattice 300a including nodes 304, 306, 308, 310. The sub-lattice 300a is in communication with a device 302 and Internet 312.

To continue the above example, FIG. 3A illustrates a flow of communications received by sub-lattice 300a in response to the above packet with a final destination of device 302. For purposes of continuing the above example, node 204, node 206, node 208, and node 210 respectively correspond with node 304, node 306, node 308, node 310, sub-lattice 200b corresponds with sub-lattice 300a, device 212 corresponds with device 302, and the device of Internet 214 corresponds with a device of Internet 312.

For example, a device of Internet 312 may provide a response packet back to a requesting packet that device 302 previously sent. However, Internet 312 does not have the source IP of device 302 due to the changes performed above by the node 204, node 206, and node 208 of sub-lattice 200b. Instead, the device of Internet 312 only has a source IP that was provided by a last hop of the sub-lattice (e.g., the egress router of the sub-lattice). For example, the device of Internet 312 would only have the thrice-changed source IP provided by node 208 of sub-lattice 200b above.

The device of Internet 312 sends the response packet to node 308, which is an ingress router for sub-lattice 300b for the response packet. As discussed above, the sub-lattices 200b, 300a have indexes identifying the routers of the sub-lattices 200b, 300a. In some embodiments, the nodes 304, 306, 308, 310 can be configured to determine the direction of communication based on the lattice index and/or sub-lattice index. For example, node 308 may be configured to determine that packets originating from device 302 travel along a specific path in a given order (e.g., a forward direction and/or reverse direction), based on the lattice index and/or sub-lattice index. Consequently, node 308 can then determine that the original packet came from node 306. Node 308 can change the source IP to the IP of node 308 and then send the response packet to node 306. Node 306 can similarly determine that the original packet came from node 304, change the source IP to the IP of node 306, and send the response packet to node 304.

Node 304 can change the source IP to the IP of node 304. Node 304 can determine, based on the lattice index and/or sub-lattice index that node 304 was the ingress router for the sub-lattice 300a. Node 304 can then decode the source IP to obtain the source IP of the originator (e.g., device 302) and send the response packet to the device 302 using the decoded, original source IP of the IP packet.

FIG. 3B illustrates a sub-lattice 300b including nodes 304, 306, 308, 310. The sub-lattice 300b is in communication with a device 302 and Internet 312. FIG. 3B illustrates an additional and/or alternative method for routing a response packet to device 302.

As discussed above, an ingress router for the sub-lattice can be configured to encrypt the interface, such that other devices may not be able to decrypt the packet. For example, FIG. 2B illustrates node 204 receiving the packet from device 212. Node 204 can encrypt the packet prior to sending the packet onwards to node 206.

Turning back to FIG. 3B, a device of Internet 312 sends a response packet to node 308 (e.g., router C). Node 308 can attempt to decrypt the response packet, but may not be successful in the attempt. Node 308 can determine that it is unable to decrypt the response packet and send the response packet to a next hop of the sub-lattice 300b, which is illustrated in FIG. 3B as node 310 (e.g., router D).

Node 310 can similarly attempt to decrypt the response packet. However, since it is also not the original router that encrypted the original packet, node 310 will also fail to decrypt the packet. Node 310 can then also send the response packet to a next hop of the sub-lattice 300b, which is illustrated in FIG. 3B as node 304.

Node 304 will also attempt to decrypt the response packet. Since node 304 was the original ingress router that encrypted the interface of the original packet, node 304 will be able to successfully decrypt the interface based on the interface encoding and determine the original source IP. Using the decrypted, original source IP, node 304 can then send the response packet to the requesting and/or original device (e.g., device 302).

One of ordinary skill in the art would understand that the techniques discussed in FIG. 3A and FIG. 3B can be used individually and/or in combination to route the response packet back to the requesting device, while also ensuring privacy and security.

Figure 4:
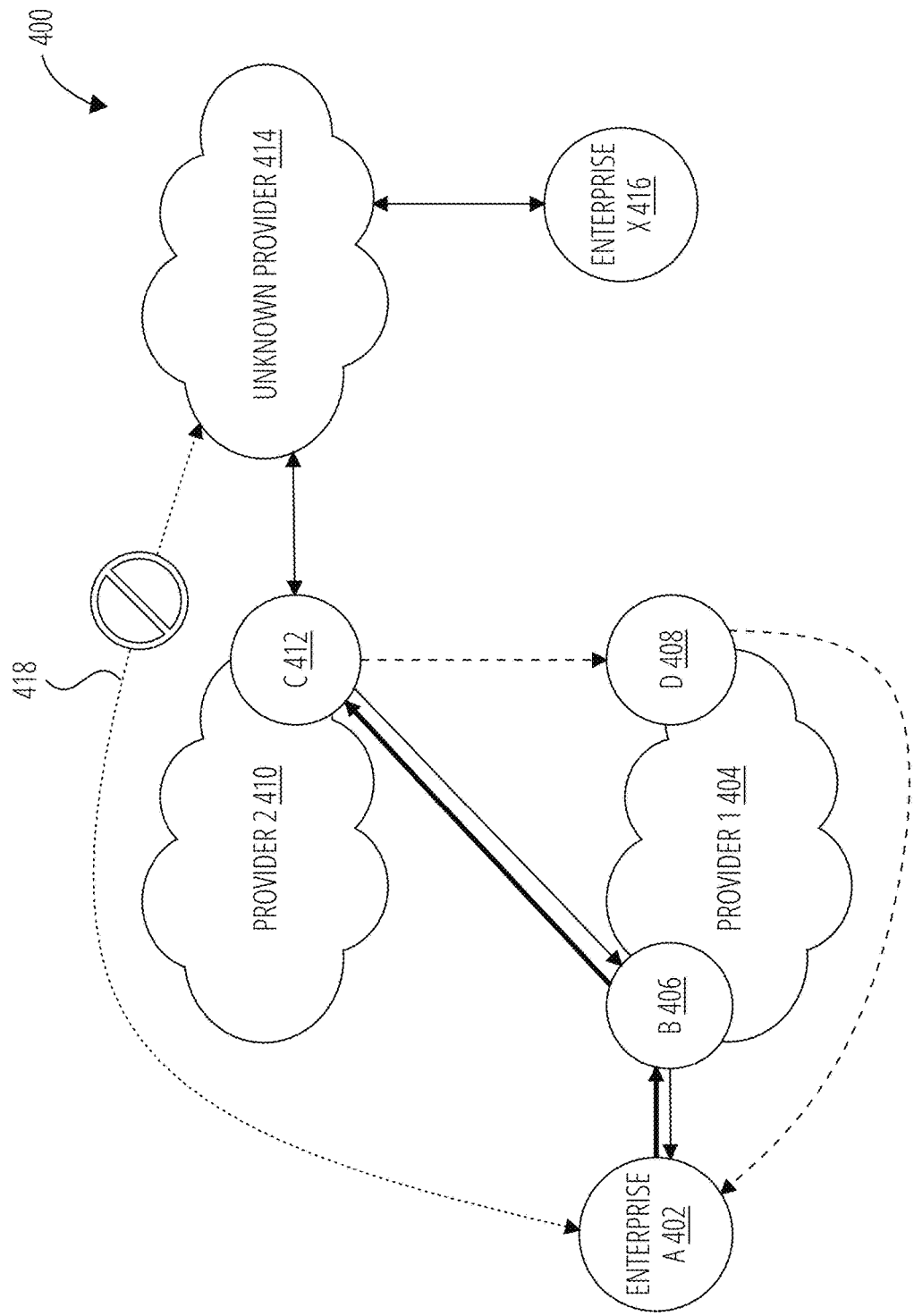
FIG. 4 illustrates an example network environment in accordance with some aspects of the present technology

FIG. 4 illustrates a network environment 400 including an enterprise 402 (e.g., enterprise A) sending a packet to enterprise 416 (e.g., enterprise X).

Classically, enterprise 402 would likely route the path through a shortest path based on some optimization technique. Classical routing 418 illustrates an exemplary shortest path through an unknown provider 414 to reach enterprise 416. This classical routing 418 leaves viewers of the packets with a clear view of the source IP.

Using lattice routing, enterprise 402 can send a packet through providers 404, 410, while maintaining additional security and privacy (e.g., as illustrated by the bolded lines). For example, enterprise 402 can send, through a device of enterprise 402, an IP packet to a node 406 (e.g., router B) of provider 404 (e.g., provider 1). Node 406 can receive the IP packet, change the source IP of the packet to an IP of node 406. Now, the IP packet has no reference to enterprise 402 and viewers of the IP packet will not be able to determine any relationship between the IP packet and enterprise 402. Instead, the IP packet appears to be originating from provider 404. Based on the lattice index and index number, node 406 sends the changed IP packet to node 412 (e.g., router C) of provider 410 (e.g., provider 2).

Node 412 receives the changed IP packet and rewrites the source IP of the IP packet again. Now, the IP packet has no reference to enterprise 402 and/or provider 404, leaving viewers of the IP packet unable to determine any relationship between the IP packet and enterprise 402 and/or provider 404. Instead, the IP packet now appears to be originating from provider 410. Node 412 can then send the IP packet out of the lattice. For example, node 412 can send the IP packet to unknown provider 414, which can ultimately route the packet to enterprise 416. The recipient of the IP packet will be unable to ascertain the true originator of the packet, providing the originator privacy and security.

In response, enterprise 416 can send a response packet (e.g., through unknown provider 414) back to node 412 of provider 410. As discussed above, multiple methods can be used to return the response packet to enterprise 402. For example, node 412 can determine the reverse direction of the lattice and send the IP packet back to node 406 of provider 404, which can then route the IP packet to enterprise 402 (e.g., as illustrated by the solid, unbolded line). Additionally and/or alternatively, node 412 can send the IP packet to a next hop of the lattice, node 408 (e.g., router D) of provider 404. Node 408 can then attempt to decrypt the packet and, upon determining that it is unsuccessful in decrypting the packet, send the packet to a next hop of the lattice, enterprise 402 (e.g., as illustrated by the dashed lines).

Regardless of which method is used, enterprise 402 can receive the IP packet and decrypt the interface to determine that it was the originator of the packet in the lattice.

As another example, an IPV6 client can issue a connection to a remote host. For a TCP connection, the client interface ID in an IPV6 header is encrypted at the origin router level. The randomness per flow set in the interface ID is used to produce an index number from the lattice. The origin router will keep forwarding packets to another router participating in a lattice design, which will replace the prefix IP until the indexed egress router is reached and before routing to the destination host. Therefore, the final packet leaving the lattice has an encrypted Interface ID and a prefix different from the Origin's prefix.

As another example, an IPV6 client can issue a connection to a remote host. For any TCP or UDP connection, the sequence/time combinations are used to produce a hash number as index on the lattice. The origin router will keep forwarding the packet to another router participating in a lattice, which will replace the prefix IP until the indexed egress router is reached and finally routing to the destination host. Therefore, the final packet leaving the Lattice has an encrypted Interface ID and a prefix different from the Origin's prefix.

A response packet from the host incoming to the router who sent the packet will attempt to decipher (decode) the interface ID and perform validity (e.g, non-DDOS) of the packet. Once validated, the packet is forwarded to the next router in the lattice until the Origin router is found by simply being able to fully decode the interface ID and recover the actual IP of the client. In some embodiments, the randomization value is extracted from the destination interface ID, which can be used as the source interface ID. Another method on the reverse traversal is the indexed look up by traversing the lattice backward.

Figure 5:
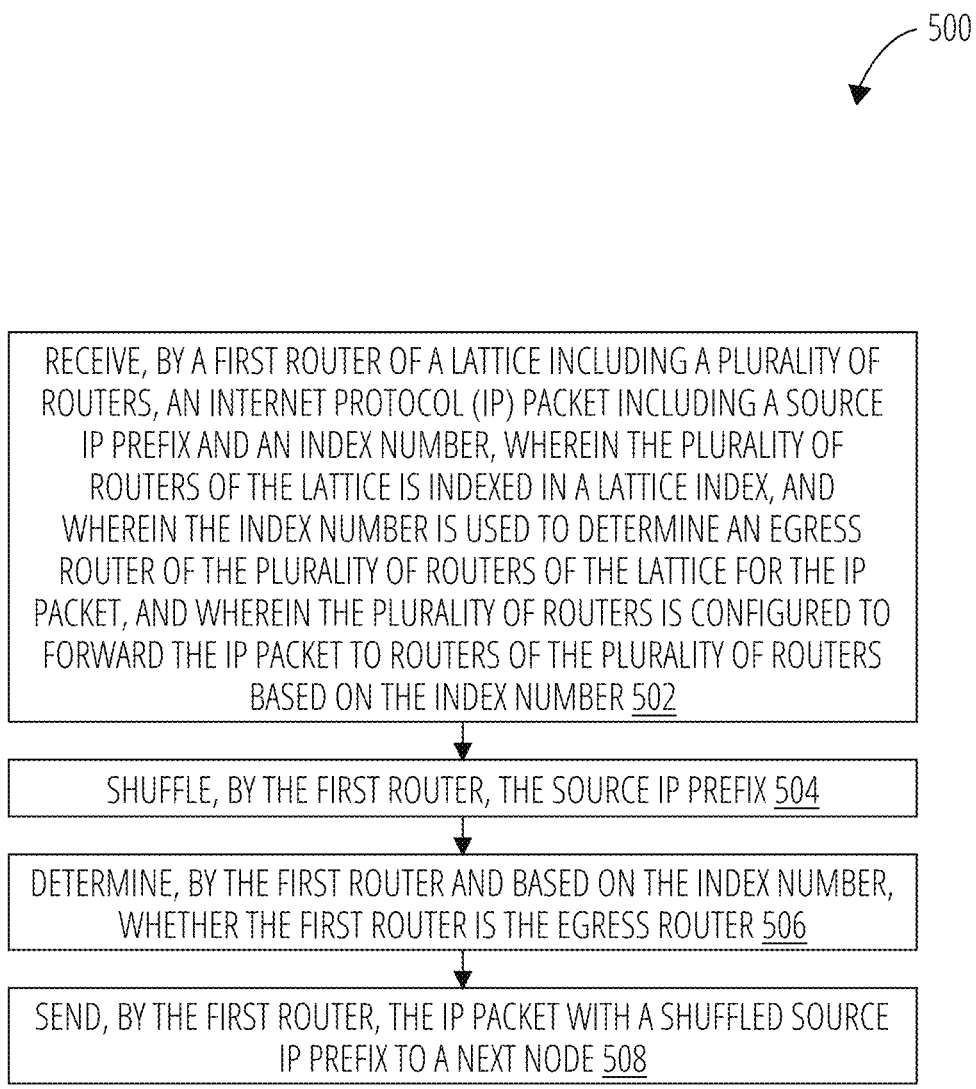
FIG. 5 illustrates a method for lattice routing across a plurality of routers in accordance with some aspects of the present technology.

FIG. 5 illustrates an example method 500 for lattice routing across a plurality of routers. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

In block 502, method 500 receives, by a first router of a lattice including a plurality of routers, an Internet Protocol (IP) packet including a source IP prefix and an index number, wherein the plurality of routers of the lattice is indexed in a lattice index, and wherein the index number is used to determine an egress router of the plurality of routers of the lattice for the IP packet, and wherein the plurality of routers is configured to forward the IP packet to routers of the plurality of routers based on the index number.

In block 504, method 500 shuffles, by the first router, the source IP prefix. In block 506, method 500 determines, by the first router and based on the index number, whether the first router is the egress router.

In block 508, method 500 sends, by the first router, the IP packet with a shuffled source IP prefix to a next node.

Figure 6:
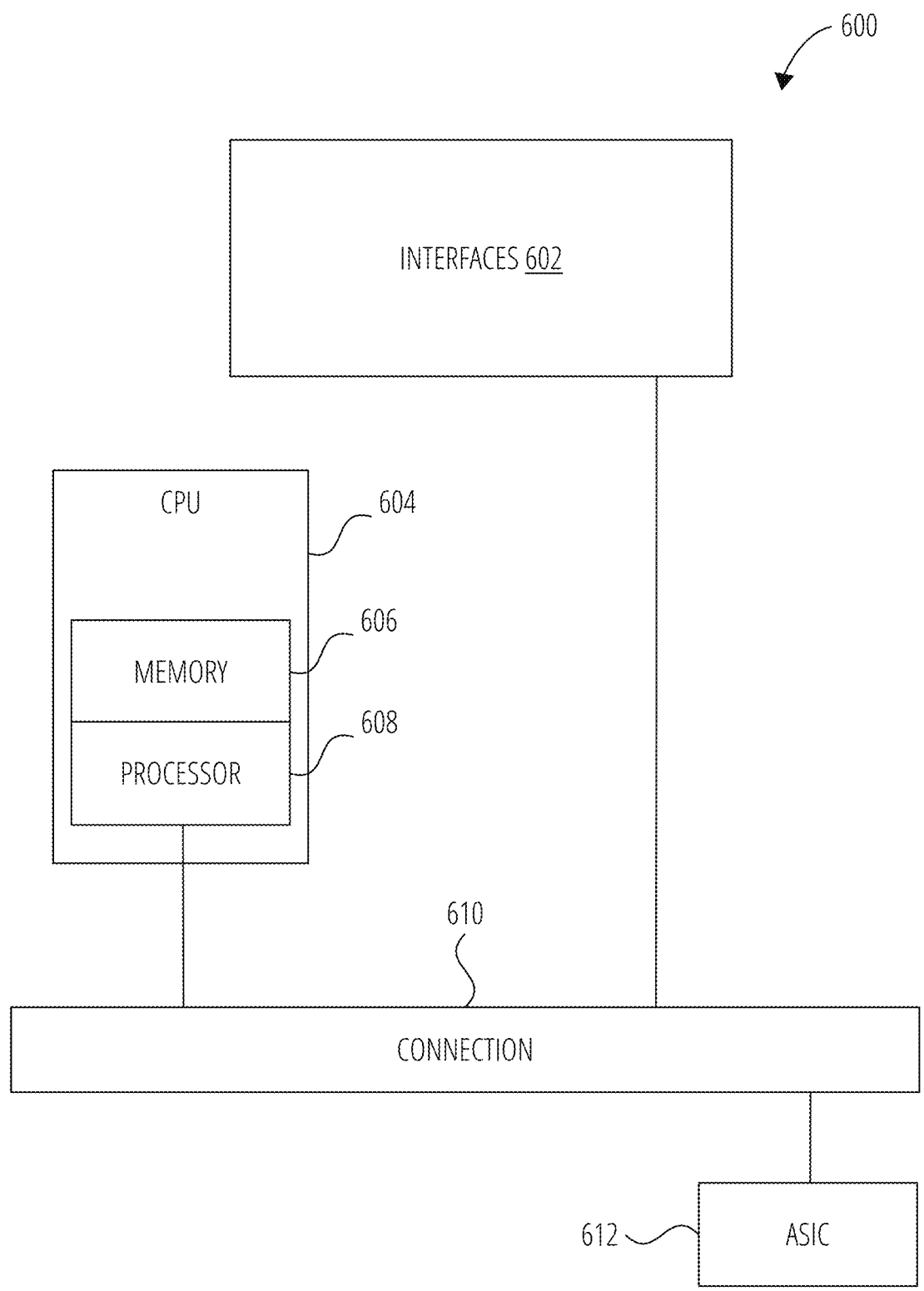
FIG. 6 illustrates an example network device for implementing certain aspects of the present technology.

FIG. 6 illustrates an example network device 600 suitable for performing switching, routing, load balancing, and other networking operations. The example network device 600 can be implemented as switches, routers, nodes, metadata servers, load balancers, client devices, and so forth.

Network device 600 includes a central processing unit (CPU) such as CPU 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors such as processor 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., CPU 604) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC) such as ASIC 612, which can be configured to perform routing and/or switching operations. The ASIC 612 can communicate with other components in the network device 600 via the connection 610, to exchange data and signals and coordinate various types of operations by the network device 600, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for lattice routing across a plurality of routers, the method comprising:
   receiving, by a first router of a lattice including a plurality of routers, an Internet Protocol packet including a source Internet Protocol prefix and an index number, wherein the plurality of routers of the lattice is indexed in a lattice index, and wherein the index number is used to determine an egress router of the plurality of routers of the lattice for the Internet Protocol packet, and wherein the plurality of routers is configured to forward the Internet Protocol packet to routers of the plurality of routers based on the index number;
   shuffling, by the first router, the source Internet Protocol prefix;
   determining, by the first router and based on the index number, whether the first router is the egress router; and
   sending, by the first router, the Internet Protocol packet with a shuffled source Internet Protocol prefix to a next node.

2. The method of claim 1, wherein the first router is not the egress router, and wherein the next node is a second router of the lattice.

3. The method of claim 2, wherein the shuffled source Internet Protocol prefix of the Internet Protocol packet is further shuffled by the second router prior to being forwarded to a subsequent node.

4. The method of claim 1, wherein the first router is the egress router, and wherein the next node is a destination host.

5. The method of claim 1, wherein the index number is produced using an interface identifier of the Internet Protocol packet.

6. The method of claim 5, further comprising:
   receiving, by the first router, a response packet; and
   attempting, by the first router, to decipher the interface identifier.

7. The method of claim 6, further comprising:
   determining, by the first router and based on successful deciphering of the interface identifier, that the first router is an origin router, wherein successfully deciphering the interface identifier recovers the source Internet Protocol prefix; and
   sending, by the first router, the response packet to a requesting client, wherein the Internet Protocol packet is received from the requesting client.

8. The method of claim 6, further comprising:
   determining, by the first router and based on unsuccessful deciphering of the interface identifier, that the first router is not an origin router; and
   sending, by the first router, the response packet to another router of the lattice based on the lattice index.

9. The method of claim 1, wherein the first router is a router of a sub-lattice that is a subset of routers of the plurality of routers of the lattice.

10. A non-transitory computer-readable medium storing instructions thereon, wherein the instructions, when executed by one or more processors, cause the one or more processors to perform operations comprising:

receive, by a first router of a lattice including a plurality of routers, an Internet Protocol packet including a source Internet Protocol prefix and an index number, wherein the plurality of routers of the lattice is indexed in a lattice index, and wherein the index number is used to determine an egress router of the plurality of routers of the lattice for the Internet Protocol packet, and wherein the plurality of routers is configured to forward the Internet Protocol packet to routers of the plurality of routers based on the index number;

shuffle, by the first router, the source Internet Protocol prefix;

determine, by the first router and based on the index number, whether the first router is the egress router; and send, by the first router, the Internet Protocol packet with a shuffled source Internet Protocol prefix to a next node.

11. The non-transitory computer-readable medium of claim 10, wherein the first router is not the egress router, and wherein the next node is a second router of the lattice.

12. The non-transitory computer-readable medium of claim 11, wherein the shuffled source Internet Protocol prefix of the Internet Protocol packet is further shuffled by the second router prior to being forwarded to a subsequent node.

13. The non-transitory computer-readable medium of claim 10, wherein the first router is the egress router, and wherein the next node is a destination host.

14. The non-transitory computer-readable medium of claim 10, wherein the index number is produced using an interface identifier of the Internet Protocol packet.

15. The non-transitory computer-readable medium of claim 14, wherein the instructions, when executed by the one or more processors, cause the one or more processors to further perform operations comprising:

receiving, by the first router, a response packet; and attempting, by the first router, to decipher the interface identifier.

16. The non-transitory computer-readable medium of claim 15, wherein the instructions, when executed by the one or more processors, cause the one or more processors to further perform operations comprising:

determining, by the first router and based on successful deciphering of the interface identifier, that the first router is an origin router, wherein successfully deciphering the interface identifier recovers the source Internet Protocol prefix; and sending, by the first router, the response packet to a requesting client, wherein the Internet Protocol packet is received from the requesting client.

17. The non-transitory computer-readable medium of claim 15, wherein the instructions, when executed by the one or more processors, cause the one or more processors to further perform operations comprising:

determining, by the first router and based on unsuccessful deciphering of the interface identifier, that the first router is not an origin router; and sending, by the first router, the response packet to another router of the lattice based on the lattice index.

18. A system comprising:

a processor; and a non-transitory memory storing computer-executable instructions thereon, wherein the computer-executable instructions, when executed by the processor, cause the processor to perform operations comprising:

receive, by a first router of a lattice including a plurality of routers, an Internet Protocol packet including a source Internet Protocol prefix and an index number, wherein the plurality of routers of the lattice is indexed in a lattice index, and wherein the index number is used to determine an egress router of the plurality of routers of the lattice for the Internet Protocol packet, and wherein the plurality of routers is configured to forward the Internet Protocol packet to routers of the plurality of routers based on the index number;

shuffle, by the first router, the source Internet Protocol prefix;

determine, by the first router and based on the index number, whether the first router is the egress router; and send, by the first router, the Internet Protocol packet with a shuffled source Internet Protocol prefix to a next node.

19. The system of claim 18, wherein the first router is not the egress router, and wherein the next node is a second router of the lattice.

20. The system of claim 19, wherein the shuffled source Internet Protocol prefix of the Internet Protocol packet is further shuffled by the second router prior to being forwarded to a subsequent node.

* * * * *